Feb. 21, 1956 — F. M. MORA — 2,735,805
METHOD AND RETORT ARRANGEMENT FOR CARBONIZING SAWDUST FROM WOOD
Filed Aug. 10, 1954 — 2 Sheets-Sheet 1

INVENTOR,
Fernando Mario Mora
BY
Attorney

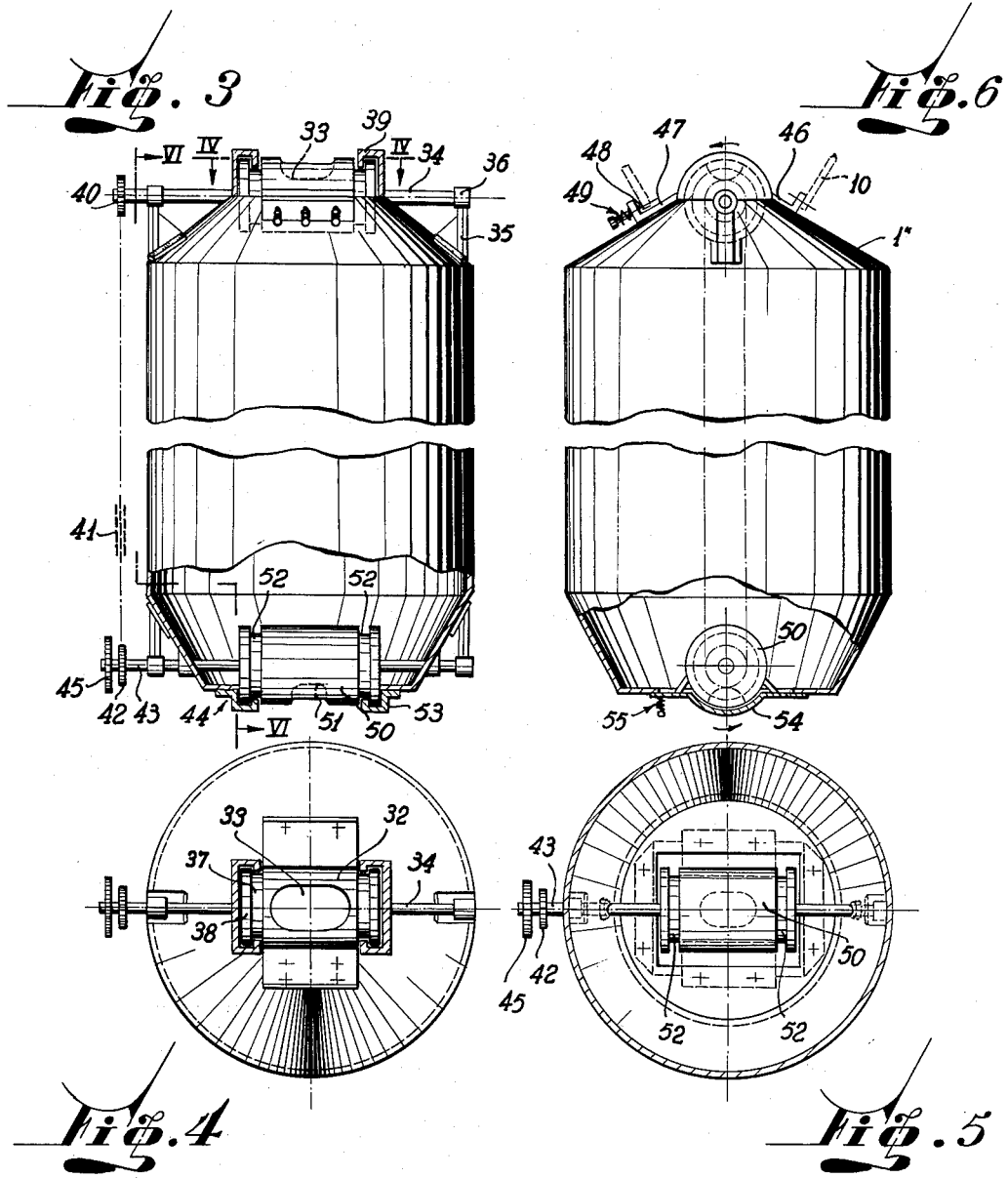

United States Patent Office 2,735,805
Patented Feb. 21, 1956

2,735,805

METHOD AND RETORT ARRANGEMENT FOR CARBONIZING SAWDUST FROM WOOD

Fernando M. Mora, Magdalena, Argentina

Application August 10, 1954, Serial No. 448,835

9 Claims. (Cl. 202—27)

This invention relates to a method for carbonizing sawdust from wood and collecting substantially all the gases arising out of said carbonization as well as to a retort arrangement and accessories for carrying out said method. More particularly, the present invention relates to a method in which the large quantities of sawdust may be used as starting material in a carbonization process by means of which reasonable industrial results are obtained.

Nowadays in some wood mills the sawdust is used for producing heat by burning the former, but the calorific power of said sawdust is very low and therefore if use is made of the present invention the efficiency of the sawdust may be considerably increased.

By "sawdust" is to be understood, that produced from wood.

The present invention relates therefore to a method for carbonizing sawdust and collecting substantially all the gases arising out of said carbonization, which comprises the steps of progressively drying the sawdust with the used heating gases arising out of the carbonizing retort whilst the sawdust is displaced towards the inlet of said retort, forming a sawdust accumulation at said inlet and preheating there said sawdust, intermittently supplying successive charges of sawdust into said retort and substantially vertically displacing said successive sawdust charges downwardly towards the outlet of said retort and discharging through said outlet successive intermittent charges of carbonized sawdust and collecting and withdrawing during said carbonization by means of a collector duct arranged in said retort the gases produced by said carbonization in substantially all the zones of said retort.

The present invention relates furthermore to a retort arrangement and accessories for carbonizing sawdust and collecting substantially all the gases arising out of said carbonization, furnace means, a heating chamber having a first upper end portion, a substantially vertical retort having a second upper end portion and a lower end portion, said retort being housed in said heating chamber connected to said furnace means adapted to generate heating gases, a hopper, a preheating chamber, said hopper being arranged in said preheating chamber and connected to said second upper end portion, a connection for said heating gases from said first upper end portion to said preheating chamber, a chimney, a drying tunnel having an end portion, said preheating chamber being connected to said drying tunnel, said end portion being spaced apart from said hopper and connected to said chimney for discharging said heating gases, a sawdust supply opening connected to said end portion and insulated from outside, sawdust transport means in said drying tunnel, intermittent sawdust charge means connected to said second upper end portion and to said hopper, intermittent carbonized sawdust discharge means connected to said lower end portion of said retort, distilling gases collecting means having a third upper end portion and housed substantially along the total height in said retort so as to collect the gases produced at any height in said retort, a conduit for discharging towards outside said distilling gases and connected to said third upper end portion.

From the foregoing it is apparent that it is an object of the present invention to provide a method and retort arrangement which enables to the carbonization of sawdust in a sufficiently economic way so that it may be successfully used.

Another object is to provide a method and retort arrangement by means of which it is possible to increase the calorific power of the sawdust, when used as heating agent.

Still another object is to provide an arrangement consisting of devices of relatively low cost.

A still further object is to provide a retort arrangement and accessories where the charge or supply means are intermittent so that practically no distilling gases will be discharged through the inlet of the retort.

Another object is to provide a retort arrangement which for operation does not require any other raw material than sawdust because from the distilling gases carbon anhydride is obtained which may be used for generating the necessary heat.

These and further objects and advantages of the present invention will become more apparent during the course of the following description wherein by way of example a preferred embodiment has been shown in several figures.

In the drawings:

Figure 3 is a front elevation of the retort as such.

Figure 4 is a cross section along lines IV—IV of Figure 3.

Figure 5 is a cross section along lines V—V of Figure 3.

Figure 6 is a longitudinal section along lines VI—VI of Figure 3.

Figure 7 is a side elevation partially in section of the distilling gases collecting tube.

Figure 1:
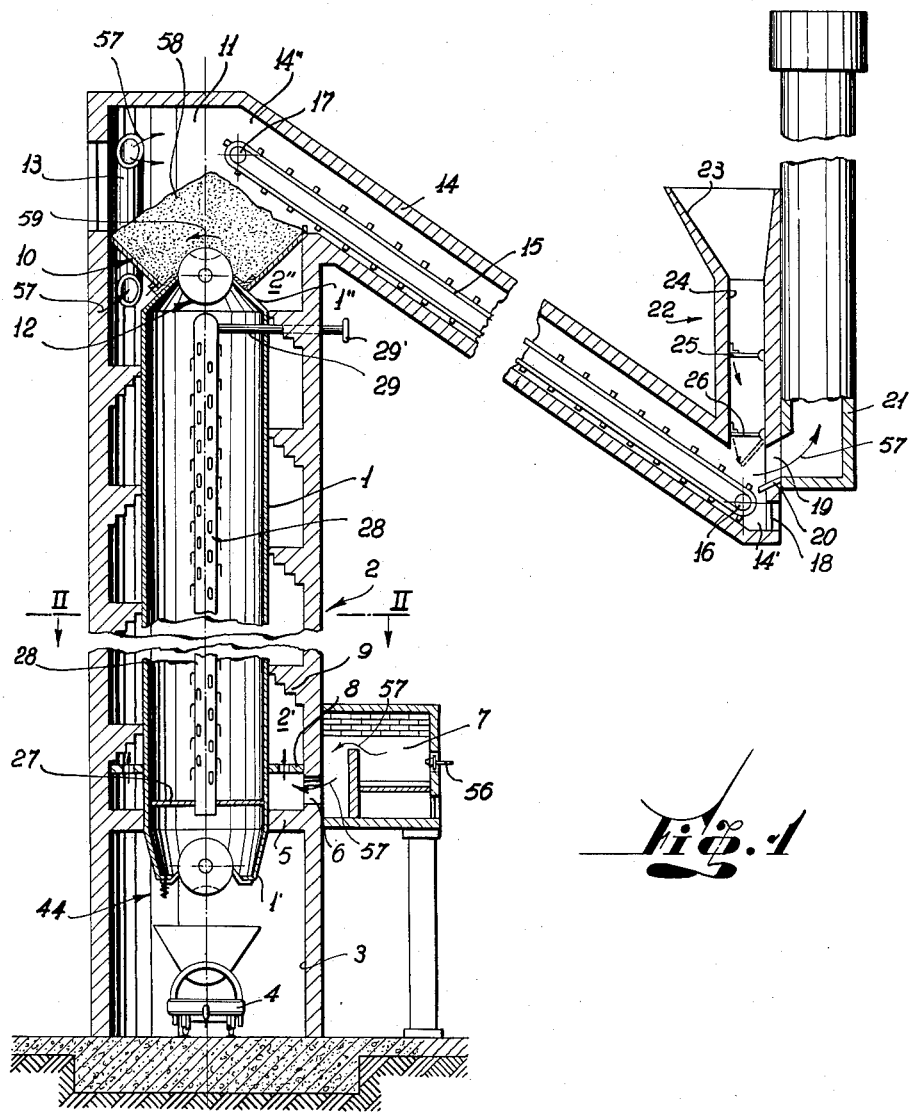
Figure 1 is a longitudinal somewhat schematical section of a retort arrangement and accessories for carbonizing wood sawdust, in accordance with the present invention.
Figure 2:
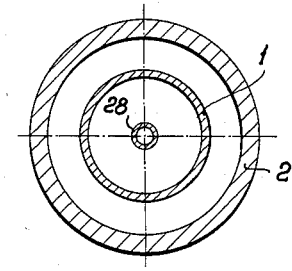
Figure 2 is a cross section along lines II—II of Figure 1.

As may be appreciated mainly in Figure 1, the retort arrangement and accessories which enables to carry out the method for carbonizing sawdust of the present invention consists of a vertical retort or container 1, arranged in a heating chamber 2, usually of insulating masonry and which is provided at its base portion with the discharge tunnel 3 through which run a plurality of wagons 4, adapted to receive carbonized sawdust, as will be later seen. The discharge tunnel 3 is separated from the interior of the heating chamber 2 by a panel 5. The lower end portion 1' of the vertical retort 1 enters said discharge tunnel 3.

Adjacent to the base panel 5 and in the heating chamber 2, a connection 6 connects the furnace 7 with the interior 2' of the heating chamber 2. A distributing grid 8 will substantially uniformly distribute the heating gases produced in furnace 7 and which heating gases rise along a helical path, due to helix 9 arranged in the interior 2' of the heating chamber 2. The upper end portion 1" (hereinafter also called the "second upper end portion") of the vertical retort or container 1 is integral with a hopper 10 which separates the upper end portion "2" (hereinafter also called the "first upper end portion") of teh heating chamber 2 from the preheating chamber 11, wherein charge means 12 are arranged, to which reference will be made later on. A connecting tube 13 connects the upper end portion 2" of the heating chamber 2 with the preheating chamber 11. The preheating chamber 11 on its turn, is connected to a drying tunnel 14 in which an endless sawdust transporting band 15 is mounted on roller 16 and 17, one of which is connected to a driving unit. The transporting band 15 connects the lower end portion 14' of tunnel 14 with the upper end portion 14" thereof. The lower end portion 14' comprises a discharge panel 18 for sawdust which eventually may have fallen off the transporting band 15 and it further comprises a connection 19 arranged above said discharge panel 18 and which connection 19 is provided at its base portion with a projection 20, the object of which will be later explained. Said connection 19 disembogues into a chimney 21 which is adjacent to a charge opening 22 for the sawdust. This charge opening 22 comprises a chute 23 the lower end of which is connected to a supply channel 24 in which two unidirectional flapper valves 25 and 26 are arranged for preventing that the heating gases may leave in substantially important quantities the charge opening 22.

The vertical container or retort 1 (see also Figures 2 to 7) consists of a vertical tube 1 wherein a collecting tube 28 substantially coaxial with the center line of said vertical tube 1 is arranged and supported at its lower end portion by a cross bar 27, which collecting tube 28 collects the distilling gases. The upper end portion (hereinafter also called "third upper end portion") of said collecting tube 28 is directly supported by a discharge branch 29 which passes through the masonry to the outside and there forming a discharge opening 29' connected to a gas distilling plant as for instance that described in my copending applications Serial Nos. 304,022, 304,023, 304,-024, 304,025 and 304,026, all filed August 12, 1952.

As may be appreciated from Figure 7, the collector tube 28 comprises a plurality of perforations 30 protected by protector wings 31 connected to said tube 28 by their respective upper end portions whilst their respective lower end portions are separated from said tube 28 so as to enable the gases to enter said tube 28 through said perforations 30 and at the same time avoiding that the successive charges of sawdust supplied by the upper end portion 1" may clog said perforations 30 or enter in important quantities said collector tube 28.

The charge means 12 arranged in the upper end portion 1" consists, as may be better seen in Figures 3, 4 and 6, of a drum 32 having a charge cavity 33 and is rotatably mounted on a first shaft 34 supported by brackets 35 provided with bearings 36. Drum 32 comprises respective outer peripheral channels 37 and end portions 38 which are of substantially the same diameter as the drum 32. Protector or sealing caps 39 are partially housed in said channels 37.

A transmission gear 40 is mounted on one end portion of shaft 34 and is provided with a transmission chain 41 or the like, which is further connected to a lower transmission gear 42 mounted on shaft 43 of the discharge means 44, which will be described later on with more details. Shaft 43 further supports a driving gear 45 connected to a driving unit, not shown.

The hopper 10 comprises at one of its ends a stationary L shaped bar 46 connected to the upper end portion 1" and a movable L shaped bar or elastic scraper 47 slidably arranged on said upper end portion 1" and guided by a guiding shaft 48 provided with a compression spring 49 urging the free end of said scraper 47 against the periphery of drum 32.

A similar arrangement as that described with regard to the charge means 12 is used for the discharge means 44, see also Figure 5. This discharge means comprises a drum 50 having a discharge cavity 51 of smaller volume than said charge cavity 33. The drum is provided with two channels 52 which enable to mount corresponding protector or sealing caps 53 thereon. A scraper 54 also elastically mounted by an arrangement 55, maintains drum 50 in clean condition.

The operation of the arrangement above described is carried out by generating in first instance in furnace 7 the heating gases, which may be supplied by the above mentioned plant of my copending applications in which event the gases supplied are burned by burner 56 and the thus produced heating gases follow the path indicated by arrows 57, that is to say they pass through the connection 6 to the interior 2' of the heating chamber 2 where the larger part of heat is transferred to the interior of retort 1. Those skilled in the art will understand that the first heat transfer that is to say of the highest temperature is carried out in the lower zone of the retort and said temperature gradually decreases as the heating gases flow upwardly until they reach the upper end portion 1" where said heating gases pass through tube 13 and enter preheating chamber 11, where the hopper 10 has accumulated a certain amount of sawdust 58, as will be later seen, which sawdust is preheated in chamber 11 by said gases, whereupon the heating gases at a considerably lower temperature carry on their path through the drying tunnel 14, wherethrough the sawdust is transported by the transport band 15 and said heating gases thus substantially completely used are finally discharged through connection 19 into chimney 21, which produces a certain draft as to assure the correct flow of the heating gases at a suitable speed.

With regard to the sawdust the latter is charged into chute 23 and accumulates on the upper flapper valve 25 until having a sufficient weight as to overcome said valve and fall onto the second flapper valve 26. In this moment the upper flapper valve 25 is closed and thereby the connection to the outside, and valve 26 is opened and discharges the sawdust onto the transporting band 14. It is thus avoided that the heating gases will be discharged in important quantities through charge opening 22. The projection 20 assures that practically all of the sawdust which is discharged by the second valve 26 falls onto the lower end of the transporting band 15 which slowly moves in the drying tunnel 14 and said sawdust is slowly transported towards the upper end 14" in opposite direction to the heating gas flow direction, so that as the sawdust approaches the preheating chamber 11, it entered into zones of higher temperatures whereby a progressive and continuous drying action is carried out on the sawdust which is discharged into hopper 10 where it is preheated by the gases discharged through tube 13.

The inlet or charge means 12 and more particularly the drum 32 continuously rotates in the direction indicated by arrow 59 discharging with each revolution a certain amount of sawdust into the interior of retort 1. The elastic scraper 47 maintains the drum 32 clean and at the same time it assures that the intermittent charges of sawdust housed in cavity 33 remain uniform. The scraper is elastically urged in order to avoid damages in case the sawdust includes small pieces of wood which would project out of cavity 33.

The charge device or means 12 described has the advantage that it assures that the distilling gases will not be discharged into the preheating chamber 11.

It is obvious that drum 32 may be provided with several cavities 33 instead of the single cavity as shown in the drawings.

Intermittent feeding has been found to be more suitable for the sawdust distilling process because the more uniform distillation results. The distilling gases which are produced during the carbonization of the sawdust are collected, as already described, by collector tube 28 whilst each sawdust charge is advancing towards the lower end portion 1' of the retort 1, entering in zones of higher temperatures whereby a progressive sawdust distillation is obtained and thus the volume and height of the retort is reduced at the same time as the volume of each charge is reduced, while advancing towards the lower end, so that when finally reaching the discharge means 44 it is sufficient that the latter is provided with the discharge cavity 51, as previously stated, and that said discharge drum 50 is synchronized with the charge unit 12, which in the embodiment shown is achieved by transmission chain 41.

The wagons 4 will receive the carbonized sawdust and send it to cooling chambers or the like which do not form part of the present invention.

Bearing in mind the above described arrangement it will be understood that the latter enables to carry out a continuous sawdust carbonizing method where the sawdust is progressively dried and preheated prior to subjecting it to the distilling step so that the latter is carried out in the minimum necessary time and the height of the retort is also reduced to minimum. At the same time use is made of the heating gases in a very successive way so that the loss of heat energy is reduced to a minimum.

I claim:

1. In a retort arrangement and accessories for carbonizing sawdust and collecting substantially all the gases arising out of said carbonization, furnace means, a heating chamber having a first upper end portion, a substantially vertical retort having a second upper end portion and a lower end portion, said retort being housed in said heating chamber connected to said furnace means adapted to generate heating gases, a hopper, a preheating chamber, said hopper being arranged in said preheating chamber, and connected to said second upper end portion, a connection for said heating gases from said first upper end portion to said preheating chamber, a chimney, a drying tunnel having an end portion, said preheating chamber being connected to said drying tunnel, said end portion being spaced apart from said hopper and connected to said chimney for discharging said heating gases, a sawdust supply opening conected to said end portion and insulated from outside, sawdust transport means in said drying tunnel, intermittent sawdust charge means connected to said second upper end portion and to said hopper, intermittent carbonized sawdust discharge means connected to said lower end portion of said retort, distilling gases collecting means having a third upper end portion and housed substantially along the total height in said retort so as to collect the gases produced at any height in said retort, a conduit for discharging towards outside said distilling gases and connected to said third upper end portion.

2. In a retort arrangement and accessories for carbonizing sawdust and collecting substantially all the gases arising out of said carbonization, furnace means, a heating chamber having a first upper end portion, a substantially vertical retort having a second upper end portion and a lower end portion said retort being housed in said heating chamber connected to said furnace means adapted to generate heating gases, a hopper, a preheating chamber, said hopper being arranged in said preheating chamber and connected to said second upper end portion, a connection for said heating gases from said first upper end portion, to said preheating chamber, a chimney, a drying tunnel having an end portion, said preheating chamber being connected to said drying tunnel, said end portion being spaced apart from said hopper and connected to said chimney for discharging said heating gases, a sawdust supply opening connected to said end portion and insulated from outside, sawdust transport means consisting of an endless transport band in said drying tunnel, intermittent sawdust charge means connected to said second upper end portion and to said hopper, intermittent carbonized sawdust discharge means connected to said lower end portion of said retort, distilling gases collecting means having a third upper end portion and housed substantially along the total height in said retort so as to collect the gases produced at any height in said retort, a conduit for discharging towards outside said distilling gases and connected to said third upper end portion, said transport band being adapted to transport sawdust from said lower end portion towards said preheating chamber.

3. In a retort arrangement and accessories for carbonizing sawdust and collecting substantially all the gases arising out of said carbonization, furnace means, a heating chamber having a first upper end portion, a substantially vertical retort having a second upper end portion and a lower end portion, said retort being housed in said heating chamber connected to said furnace means adapted to generate heating gases, a hopper, a preheating chamber, said hopper being arranged in said preheating chamber and connected to said second upper end portion, a connection for said heating gases from said first upper end portion, to said preheating chamber, a chimney, a drying tunnel having an end portion, said preheating chamber being connected to said drying tunnel, said end portion being spaced apart from said hopper end connected to said chimney for discharging said heating gases, a sawdust supply opening connected to said end portion and insulated from outside, said sawdust supply opening comprising a supply channel, a chute connected to said supply channel a first and a second uni-directional flapper valves mounted in said supply channel and spaced apart, said flapper valves being adapted to block substantially the exit of heating gases through said supply channel, sawdust transport means in said drying tunnel, intermittent sawdust charge means connected to said second upper end portion and to said hopper, intermittent carbonized sawdust discharge means connected to said lower end portion of said retort, distilling gases collecting means having a third upper end portion and housed substantially along the total height in said retort so as to collect the gases produced at any height in said retort, a conduit for discharging towards outside said distilling gases and connected to said third upper end portion.

4. In a retort arrangement and accessories for carbonizing sawdust and collecting substantially all the gases arising out of said carbonization, furnace means, a heating chamber having a first upper end portion, a substantially vertical retort having a second upper end portion and a lower end portion, said retort being housed in said heating chamber connected to said furnace means adapted to generate heating gases, a hopper, a preheating chamber, said hopper being arranged in said preheating chamber and connected to said second upper end portion, a connection for said heating gases from said first upper end portion, to said preheating chamber, a chimney, a drying tunnel having an end portion, said preheating chamber being connected to said drying tunnel, said end portion being spaced apart from said hopper end connected to said chimney for discharging said heating gases, a sawdust supply opening connected to said end portion and insulated from outside, sawdust transport means in said drying tunnel, intermittent sawdust charge means connected to said second upper end portion and to said hopper, said intermitten sawdust charge means comprising a drum rotatably mounted in said second upper end portion, a cavity in said drum, said cavity being adapted to successively charge intermittent charges of sawdust and transport them towards the inside of said retort, intermittent carbonized sawdust discharge means connected to said lower end portion of said retort, distilling gases collecting means having a third upper end portion and housed substantially along the total height in said retort so as to collect the gases produced at any height in said retort, a conduit for discharging towards outside said distilling gases and connected to said third upper end portion.

5. In a retort arrangement and accessories for carbonizing sawdust and collecting substantially all the gases arising out of said carbonization, furnace means, a heating chamber having a first upper end portion, a substantially vertical retort having a second upper end portion and a lower end portion, said retort being housed in said heating chamber connected to said furnace means adapted to generate heating gases, a hopper, a preheating chamber, said hopper being arranged in said preheating chamber and connected to said second upper end portion, a connection for said heating gases from said first upper end portion, to said preheating chamber, a chimney, a drying tunnel having an end portion said preheating chamber being connected to said drying tunnel, said end portion being spaced apart from said hopper and connected to said chimney for discharging said heating gases, a sawdust supply opening connected to said end portion and insulated from outside, sawdust transport means in said drying tunnel, intermittent sawdust charge means connected to said second upper end portion and to said hopper, said intermittent sawdust charge means comprising a drum rotatably mounted in said second upper end portion, a cavity in said drum, said cavity being adapted to successively charge intermittent charges of sawdust and transport them towards the inside of said retort, intermittent carbonized sawdust discharge means connected to said lower end portion of said retort, distilling gases collecting means having a third upper end portion and housed substantially along the total height in said retort so as to collect the gases produced at any height in said retort, a conduit for discharging towards outside said distilling gases and connected to said third upper end portion and a scraper means in structural relationship with said drum and adapted to control the charge of sawdust in said cavity.

6. In a retort arrangement and accessories for carbonizing sawdust and collecting substantially all the gases arising out of said carbonization, furnace means, a heating chamber having a first upper end portion, a substantially vertical retort having a second and upper portion and a lower end portion, said retort being housed in said heating chamber connected to said furnace means adapted to generate heating gases, a hopper, a preheating chamber, said hopper being arranged in said preheating chamber and connected to said second upper end portion, a connection for said heating gases from said first upper end portion, to said preheating chamber, a chimney, a drying tunnel having an end portion, said preheating chamber being connected to said drying tunnel, said end portion being spaced apart from said hopper and connected to said chimney for discharging said heating gases, a sawdust supply opening connected to said end portion and insulated from outside, sawdust transport means in said drying tunnel, intermittent sawdust charge means connected to said second upper end portion and to said hopper, said intermittent sawdust charge means comprising a shaft, a drum mounted on said shaft, said shaft being rotatably supported by said second upper end portion, intermittent carbonized sawdust discharge means connected to said lower end portion of said retort, said discharge means comprising a second shaft, a second drum mounted on said shaft and having a second cavity for discharging carbonized sawdust which second cavity is smaller in volume than said first cavity, said second shaft being in transmission relationship with said first shaft, distilling gases collecting means having a third upper end portion and housed substantially along the total height in said retort so as to collect the gases produced at any height in said retort, a condut for discharging towards outside said distilling gases and connected to said third upper end portion.

7. In a retort arrangement and accessories for carbonizing sawdust and collecting substantially all the gases arising out of said carbonization furnace means, a heating chamber having a first upper end portion, a substantially vertical retort having a second upper end portion and a lower end portion, said retort being housed in said heating chamber connected to said furnace means adapted to generate heating gases, a hopper, a preheating chamber, said hopper being arranged in said preheating chamber and connected to said upper end portion, a connection for said heating gases from said first upper end portion, to said preheating chamber, a chimney, a drying tunnel having an end portion, said preheating chamber being connected to said drying tunnel, said end portion being spaced apart from said hopper and connected to said chimney for discharging said heating gases, a sawdust supply opening connected to said end portion and insulated from outside, sawdust transport means in said drying tunnel, intermitten sawdust charge means connected to said second upper end portion and to said hopper, intermittent carbonized sawdust discharge means connected to said lower end portion of said retort, distilling gases collecting means having a third upper end portion and housed substantially along the total height in said retort so as to collect the gases produced at any height in said retort, a conduit for discharging towards outside distilling gases and connected to said third upper end portion, a discharge tunnel, said lower end of said retort being connected to said discharge tunnel separated from said heating chamber.

8. In a retort arrangement for carbonizing sawdust and collecting substantially all the gases arising out of said carbonization, furnace means, a heating chamber having a first upper end portion, a substantially vertical retort having a second upper end portion and a lower end portion, said retort being housed in said heating chamber connected to said furnace means adapted to generate heating gases, a hopper, a preheating chamber, said hopper being arranged in said preheating chamber and connected to said second upper end portion, a connection for said heating gases from said first upper end portion, to said preheating chamber, a chimney, a drying tunnel having an end portion, said preheating chamber being connected to said drying tunnel, said end portion being spaced apart from said hopper and connected to said chimney for discharging said heating gases, a sawdust supply opening connected to said end portion and insulated from outside, sawdust transport means in said drying tunnel, intermittent sawdust charge means connected to said second upper end portion and to said hopper, intermittent carbonized sawdust discharge means connected to said lower end portion of said retort, distilling gases collecting means housed in said retort so as to collect the gases produced in said retort, a conduct for discharging towards outside said distilling gases collected by said distilling gases collecting means.

9. A method for carbonizing sawdust and collecting substantially all the gases arising out of said carbonization, which comprises the steps of progressively drying the sawdust with the used heating gases arising out of the carbonizing retort whilst the sawdust is displaced towards the inlet of said retort, forming a sawdust accumulation at said inlet and preheating there said sawdust, intermittently supplying successive charges of sawdust into said retort and substantially vertically displacing said successive sawdust charges downwardly towards the outlet of said retort and discharging through said outlet successive intermittent charges of carbonized sawdust and collecting and withdrawing during said carbonization by means of a collector duct arranged in said retort the gases produced by said carbonization in substantially all the zones of said retort.

References Cited in the file of this patent

UNITED STATES PATENTS

| 1,382,746 | Schrader et al. | June 28, 1921 |
| 1,493,880 | Jenson | May 13, 1924 |
| 1,651,647 | Trumble | Dec. 6, 1927 |
| 1,945,479 | Davis | Jan. 30, 1934 |

FOREIGN PATENTS

| 627,967 | France | June 20, 1927 |